United States Patent
Chen et al.

(10) Patent No.: US 12,133,149 B2
(45) Date of Patent: Oct. 29, 2024

(54) SERVICE INVOCATION METHOD AND NETWORK DEVICE

(71) Applicants: China Mobile Communication Co., Ltd Research Institute, Beijing (CN); China Mobile Communications Group Co.,Ltd., Beijing (CN)

(72) Inventors: Xu Chen, Beijing (CN); Yue Song, Beijing (CN)

(73) Assignees: China Mobile Communication Co., Ltd Research Institute, Beijing (CN); China Mobile Communications Group Co., Ltd, Beijing (CN)

( * ) Notice: Subject to any disclaimer, the term of this patent is extended or adjusted under 35 U.S.C. 154(b) by 412 days.

(21) Appl. No.: 17/764,698

(22) PCT Filed: Sep. 29, 2020

(86) PCT No.: PCT/CN2020/118889
§ 371 (c)(1),
(2) Date: Mar. 29, 2022

(87) PCT Pub. No.: WO2021/063360
PCT Pub. Date: Apr. 8, 2021

(65) Prior Publication Data
US 2022/0345864 A1  Oct. 27, 2022

(30) Foreign Application Priority Data
Sep. 30, 2019  (CN) .......................... 201910941178.9

(51) Int. Cl.
*H04W 4/00* (2018.01)
*H04W 4/50* (2018.01)
(Continued)

(52) U.S. Cl.
CPC ............. *H04W 4/50* (2018.02); *H04W 48/18* (2013.01); *H04W 60/00* (2013.01); *H04W 64/003* (2013.01)

(58) Field of Classification Search
CPC ....... H04W 4/50; H04W 48/18; H04W 60/00; H04W 64/003; H04W 28/04;
(Continued)

(56) References Cited

U.S. PATENT DOCUMENTS

2007/0087745 A1\* 4/2007 Poyhonen ......... H04W 36/0066
455/435.2
2018/0317157 A1\* 11/2018 Baek ..................... H04W 28/16
(Continued)

FOREIGN PATENT DOCUMENTS

CN  101043701 A  9/2007
CN  108616931 A  10/2018
(Continued)

OTHER PUBLICATIONS

Nokia, "NEF service operation correction", 3GPP TSG-SA WG2 Meeting #128bis, S2-187929, Sophia Antipolis, France, Aug. 20-24, 2018.
(Continued)

*Primary Examiner* — Phuongchau Ba Nguyen
(74) *Attorney, Agent, or Firm* — Price Heneveld LLP

(57) ABSTRACT

A service invocation method and a network device are provided. The method applied to a service provider side includes: receiving a service request for a first service by a provider of the first service, the service request being sent by a service consumer; sending a service response for the first service by the provider of the first service to the service consumer, wherein the service response for the first service includes service invocation information or a service invocation result of at least one second service associated with
(Continued)

the first service, the service invocation information is configured to instruct the service consumer to invoke the second service.

18 Claims, 8 Drawing Sheets

(51) Int. Cl.
*H04W 48/18* (2009.01)
*H04W 60/00* (2009.01)
*H04W 64/00* (2009.01)

(58) Field of Classification Search
CPC ... H04W 72/04; H04W 72/042; H04W 88/08; H04W 28/08; H04W 28/084; H04W 36/22; H04W 72/12; H04L 41/5051; H04L 45/0377; H04L 67/51; H04L 69/22; H04L 45/64; H04L 41/145; H04L 5/0007
See application file for complete search history.

(56) References Cited

U.S. PATENT DOCUMENTS

| | | | |
|---|---|---|---|
| 2019/0174449 A1* | 6/2019 | Shan | H04W 60/04 |
| 2019/0306251 A1* | 10/2019 | Talebi Fard | H04W 76/10 |
| 2019/0364458 A1 | 11/2019 | Zhou et al. | |
| 2019/0394684 A1 | 12/2019 | Li et al. | |
| 2020/0084675 A1 | 3/2020 | Lu et al. | |
| 2021/0282003 A1* | 9/2021 | Li | H04W 76/25 |
| 2021/0368473 A1 | 11/2021 | Liu et al. | |
| 2022/0201638 A1* | 6/2022 | Arrobo Vidal | H04W 48/08 |

FOREIGN PATENT DOCUMENTS

| | | |
|---|---|---|
| CN | 108632915 A | 10/2018 |
| CN | 109547955 A | 3/2019 |
| CN | 109819486 A | 5/2019 |
| JP | 2014007635 A | 1/2014 |
| WO | 2018132050 A1 | 7/2018 |

OTHER PUBLICATIONS

Huawei, "Completion of Unified Location Service Exposure Procedure for TS 23.273", 3GPP TSG-SA2 Meeting #134, S2-1907617, Sapporo, Japan, Jun. 24-Jun. 28, 2019.

"Technical Specification Group Services and System Aspects", Procedures for the 5G System (5GS), Stage 2 (Release 16), 3GPP TS 23.502 V16.2.0, Sep. 2019.

"Update to registration procedure with AMF relocation", 3GPP TSG-SA WG2 Meeting #128bis, S2-188732, Aug. 20-24, 2018, Sophia Antipolis, France.

* cited by examiner

SERVICE INVOCATION METHOD AND NETWORK DEVICE

CROSS-REFERENCE TO RELATED APPLICATION

This application is a U.S. national phase application of a PCT Application No. PCT/CN2020/118889 filed on Sep. 29, 2020, which claims a priority to Chinese Patent Application No. 201910941178.9 filed on Sep. 30, 2019, the disclosures of which are incorporated in their entirety by reference herein.

TECHNICAL FIELD

The present disclosure relates to the field of communications technology, in particular relates to a service invocation method and a network device.

BACKGROUND

The 5G (fifth generation mobile communication technology) core network adopts a service architecture (refer to FIG. 1, in which a network slice selection function is NSSF, Network Slice Selection Function; a capability opening function is NEF, a network exposure function; a NF storage function is NRF, NF Repository Function; a policy control function is PCF, Policy Control Function; unified data management is UDM, Unified Data Management; an application function is AF, application function; an authentication service function is AUSF, Authentication Server Function, which may also be referred to as an authentication service function; an access and mobility management function is AMF, Access and Mobility Management Function; a session management function is SMF, Session Management Function, a terminal is UE, User Equipment; a (radio) access network is (R)AN, (Radio) Access Network; a user plane function is UPF, User plane Function; a data network is DN, Data network), interfaces between NFs adopt service interfaces. The 5G service interface has explicitly used a HTTP/2+TCP protocol. The design of 5G service processes needs to well define a service invocation logic of all relevant network functions (NF, Network Function), and some NFs shall support a service provider function of a corresponding service. Some NFs shall support a service consumer function of the corresponding service. The NFs for a service consumer needs to write, in a service processing logic, a trigger condition of a service invocation, a service name of the service invocation and a resource address related to the service invocation. The NF for a service provider is found through a service discovery mechanism and a NF selection mechanism, and then the service invocation is performed.

The design concept for a 5G service is atomization of services, independence/decoupling between services, and reusability of services, so that services can be reused for multiple different service processes. However, service atomization design of the 5G core network (5GC, 5G Core Network) complicates a service processing procedure.

SUMMARY

In view of this, the present disclosure provides a service invocation method and a network device, so as to solve the problem in the related art that a service atomization design of a 5G core network makes a service processing process complicated.

To address the above technical problem, in a first aspect, a service invocation method is provided in this present disclosure. The method includes: receiving a service request for a first service by a provider of the first service, the service request being sent by a service consumer; sending a service response for the first service to the service consumer by the provider of the first service, wherein, the service response for the first service includes service invocation information or a service invocation result of at least one second service associated with the first service, the service invocation information is configured to instruct the service consumer to invoke the second service.

Optionally, the service invocation information includes at least one of: a service name of the second service; an address of a service provider of the second service; a parameter required for service invocation of the second service; an address of a resource associated with the second service; a method of operating a resource associated with the second service; a premise of the second service.

Optionally, the service invocation result includes at least one of: data, an address of a resource, and a response code.

Optionally, in a case where the service request for the first service is a request for the service of location registration, the second service includes a service of downloading subscription data and a service of subscribing a change of subscription data; the service invocation result of the second service includes an address of a subscription data resource and an address of a subscribed resource.

Optionally, in a case where the service request for the first service is a request for a service of location registration, the second service includes a service of downloading subscription data and a service of subscribing a change of subscription data; the service invocation information of the second service includes service invocation information of the service of downloading the subscription data and service invocation information of the service of subscribing the change of subscription data.

Optionally, in a case where the service request for the first service is a request for a service of location registration, the second service includes a service of downloading subscription data; the service invocation information of the second service includes service invocation information of the service of downloading the subscription data.

Optionally, in a case where the service request for the first service is a request for a service of downloading subscription data, the second service includes a service of subscribing a change of subscription data; the service invocation information of the second service includes service invocation information of the service of subscribing the change of the subscription data.

In a second aspect, a service invocation method is further provided in the present disclosure. The method includes: sending a service request for a first service to a provider of the first service by a service consumer; receiving a service response for the first service by the service consumer, wherein the service response for the first service includes service invocation information or a service invocation result of at least one second service associated with the first service, the service invocation information is configured to instruct the service consumer to invoke the second service; initiating invocation of a second service according to the service invocation information to obtain the service invocation result of the second service, when the service response for the first service includes the service invocation information.

Optionally, the service invocation information includes at least one of following: a service name of the second service;

an address of a service provider of the second service; a parameter required for service invocation of the second service; an address of a resource associated with the second service; a method of operating a resource associated with the second service; a premise of the second service.

Optionally, in a case where the service request for the first service is a request for a service of location registration, the second service includes a service of downloading subscription data and a service of subscribing a change of subscription data; the service invocation result of the second service includes an address of a subscription data resource and an address of a subscribed resource.

Optionally, in a case where the service request for the first service is a request for a service of location registration, the second service includes a service of downloading subscription data and a service of subscribing a change of subscription data; the service invocation information of the second service includes service invocation information of the service of downloading the subscription data and service invocation information of the service of subscribing the change of subscription data.

In a third aspect, a network device is further provided in the present disclosure, the network device is a provider of a first service, the network device includes: a first reception module, configured to receive a service request for the first service, the service request being sent by a service consumer; a response module, configured to send a service response for the first service to the service consumer, wherein the service response for the first service includes service invocation information or a service invocation result of at least one second service associated with the first service, the service invocation information is configured to instruct the service consumer to invoke the second service.

Optionally, the service invocation information includes at least one of: a service name of the second service; an address of a service provider of the second service; a parameter required for service invocation of the second service; an address of a resource associated with the second service; a method of operating a resource associated with the second service; a premise of the second service.

Optionally, the service invocation result includes at least one of: data, an address of a resource, and a response code.

Optionally, in a case where the service request for the first service is a request for the service of location registration, the second service includes a service of downloading subscription data and a service of subscribing a change of subscription data; the service invocation result of the second service includes an address of a subscription data resource and an address of a subscribed resource.

Optionally, in a case where the service request for the first service is a request for a service of location registration, the second service includes a service of downloading subscription data and a service of subscribing a change of subscription data; the service invocation information of the second service includes service invocation information of the service of downloading the subscription data and service invocation information of the service of subscribing the change of subscription data.

Optionally, in a case where the service request for the first service is a request for a service of location registration, the second service includes a service of downloading subscription data; the service invocation information of the second service includes service invocation information of the service of downloading the subscription data.

Optionally, in a case where the service request for the first service is a request for a service of downloading subscription data, the second service includes a service of subscribing a change of subscription data; the service invocation information of the second service includes service invocation information of the service of subscribing the change of the subscription data.

In a fourth aspect, a network device is further provided in the present disclosure. The network device is a service consumer, the network device includes: a sending module, configured to send a service request for a first service to a provider of the first service; a second receiving module, configured to receive a service response for the first service, wherein the service response for the first service includes service invocation information or a service invocation result of at least one second service associated with the first service, the service invocation information is configured to instruct the service consumer to invoke the second service; a service invocation module, configured to, when the service response for the first service includes the service invocation information, initiate invocation of the second service according to the service invocation information to obtain a service invocation result of the second service.

Optionally, the service invocation information includes at least one of following: a service name of the second service; an address of a service provider of the second service; a parameter required for service invocation of the second service; an address of a resource associated with the second service; a method of operating a resource associated with the second service; a premise of the second service.

Optionally, in a case where the service request for the first service is a request for a service of location registration, the second service includes a service of downloading subscription data and a service of subscribing a change of subscription data; the service invocation result of the second service includes an address of a subscription data resource and an address of a subscribed resource.

Optionally, in a case where the service request for the first service is a request for a service of location registration, the second service includes a service of downloading subscription data and a service of subscribing a change of subscription data; the service invocation information of the second service includes service invocation information of the service of downloading the subscription data and service invocation information of the service of subscribing the change of subscription data.

In a fifth aspect, a network device is further provided in the present disclosure. The network device is a provider of a first service. The network device includes a transceiver and a processor. The transceiver is configured to receive a service request for the first service, the service request being sent by a service consumer; the transceiver is further configured to send a service response for the first service to the service consumer; the service response for the first service includes service invocation information or a service invocation result of at least one second service associated with the first service, the service invocation information is configured to instruct the service consumer to invoke the second service.

Optionally, the service invocation information includes at least one of: a service name of the second service; an address of a service provider of the second service; a parameter required for service invocation of the second service; an address of a resource associated with the second service; a method of operating a resource associated with the second service; a premise of the second service.

Optionally, the service invocation result includes at least one of: data, an address of a resource, and a response code.

Optionally, in a case where the service request for the first service is a request for the service of location registration, the second service includes a service of downloading subscription data and a service of subscribing a change of subscription data; the service invocation result of the second service includes an address of a subscription data resource and an address of a subscribed resource.

Optionally, in a case where the service request for the first service is a request for a service of location registration, the second service includes a service of downloading subscription data and a service of subscribing a change of subscription data; the service invocation information of the second service includes service invocation information of the service of downloading the subscription data and service invocation information of the service of subscribing the change of subscription data.

Optionally, in a case where the service request for the first service is a request for a service of location registration, the second service includes a service of downloading subscription data; the service invocation information of the second service includes service invocation information of the service of downloading the subscription data.

Optionally, in a case where the service request for the first service is a request for a service of downloading subscription data, the second service includes a service of subscribing a change of subscription data; the service invocation information of the second service includes service invocation information of the service of subscribing the change of the subscription data.

In a sixth aspect, a network device is further provided in the present disclosure. The network device is a service consumer. The network device includes: a transceiver and a processor; the transceiver is configured to send a service request for a first service to a provider of the first service; the transceiver is further configured to receive a service response for the first service, the service response for the first service includes service invocation information or a service invocation result of at least one second service associated with the first service; the service invocation information is configured to instruct the service consumer to invoke the second service; the transceiver is further configured to, when the service response for the first service includes the service invocation information, initiate a second service invocation according to the service invocation information to obtain a service invocation result of the second service.

Optionally, the service invocation information includes at least one of following: a service name of the second service; an address of a service provider of the second service; a parameter required for service invocation of the second service; an address of a resource associated with the second service; a method of operating a resource associated with the second service; a premise of the second service.

Optionally, in a case where the service request for the first service is a request for a service of location registration, the second service includes a service of downloading subscription data and a service of subscribing a change of subscription data; the service invocation result of the second service includes an address of a subscription data resource and an address of a subscribed resource.

Optionally, in a case where the service request for the first service is a request for a service of location registration, the second service includes a service of downloading subscription data and a service of subscribing a change of subscription data; the service invocation information of the second service includes service invocation information of the service of downloading the subscription data and service invocation information of the service of subscribing the change of subscription data.

In a seventh aspect, a network device is further provided in the present disclosure. The network device is a provider of a first service. The network device includes: a memory, a processor, and a computer program stored on the memory and executable on the processor, wherein, the processor implements steps in any one of the service invocation method at the provider side of the first service provided above, when the processor executes the computer program.

In an eighth aspect, a network device is further provided in the present disclosure. The network device is a service consumer, the network device includes: a memory, a processor, and a computer program stored on the memory and executable on the processor; wherein, the processor implements steps in any one of the service invocation methods at the service consumer side, when the processor executes the computer program.

In a ninth aspect, a computer-readable storage medium having stored thereon a computer program is further provided in the present disclosure. When the computer program is executed by a processor, the processor implements steps in any one of the service invocation methods provided above.

The advantageous effects of the above technical solutions of the present disclosure are as follow.

In the embodiments of the present disclosure, after the provider of the first service receives the service request for the first service sent by the service consumer, and if the provider of the first service can determine the second service that the service consumer needs to subsequently invoke, then the service response for the first service carries the service invocation information or the service invocation result of the second service, thereby optimizing the service processing logic and reducing the service processing complexity.

DETAILED DESCRIPTION

In order to make objectives, technical solutions and advantages of the embodiments of the present disclosure clearer, technical solutions of the embodiments of the present disclosure will be clearly and completely described below with reference to the drawings of the embodiments of the present disclosure. It is apparent that the described embodiments are part, rather than all, of the embodiments of the present disclosure. Based on the described embodiments of the present disclosure, all other embodiments obtained by those skilled in the art belong to the protection scope of the present disclosure.

Service processing based on a service architecture mainly includes following processes 1-3.

Figure 1:
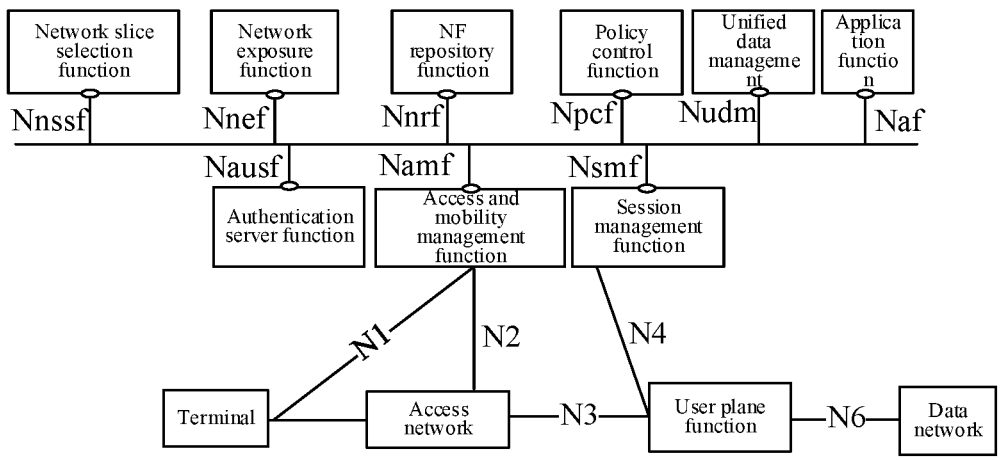
FIG. 1 is a schematic diagram of a service architecture of a 5G core network.
Figure 2:
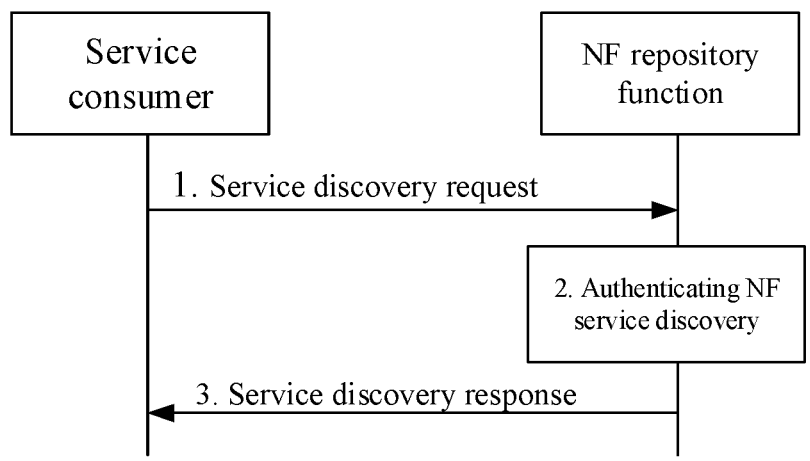
FIG. 2 is a flow chart of service discovery.
Figure 3:
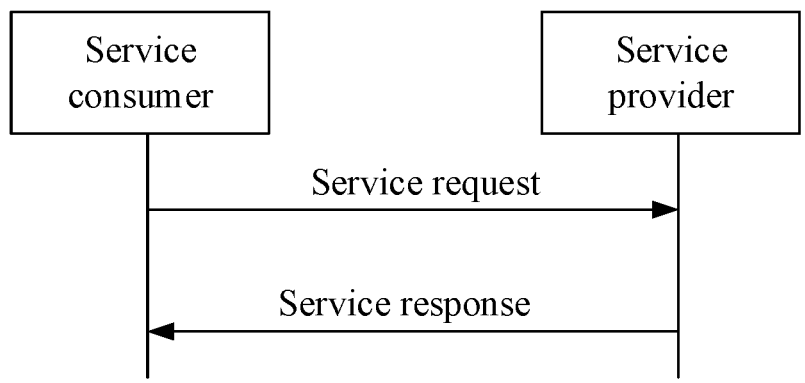
FIG. 3 is a flow chart of service invocation.

1. service registration: a NF for a service provider performs service registration with a NF storage function (NRF, NF Repository Function), and registers all services and relevant information provided by the NF for the service provider. The relevant information contains information required for a service consumer to discover the NF (description information of the NF (NFProfile) provides the information required for the service consumer to discover the NF, such as the Authentication Service Function (AUSF, also referred to as an authentication service function) provides AUSF information (ausfInfo);

2. service discovery: referring to FIG. 2, a NF for a service consumer (Service Consumer) initiates a service discovery request (Nnrf_NFDiscovery_Request) to the NRF, and finds, through the NRF, a NF for a provider providing a specific service (related to a service process of an upper-layer application) to be invoked;

3. service invocation: referring to FIG. 3, after a service consumer receives a service discovery response from the NRF, the service consumer sends a service request to a NF for a service provider indicated in the service discovery response, and receives a service response returned by the service provider.

Figure 4:
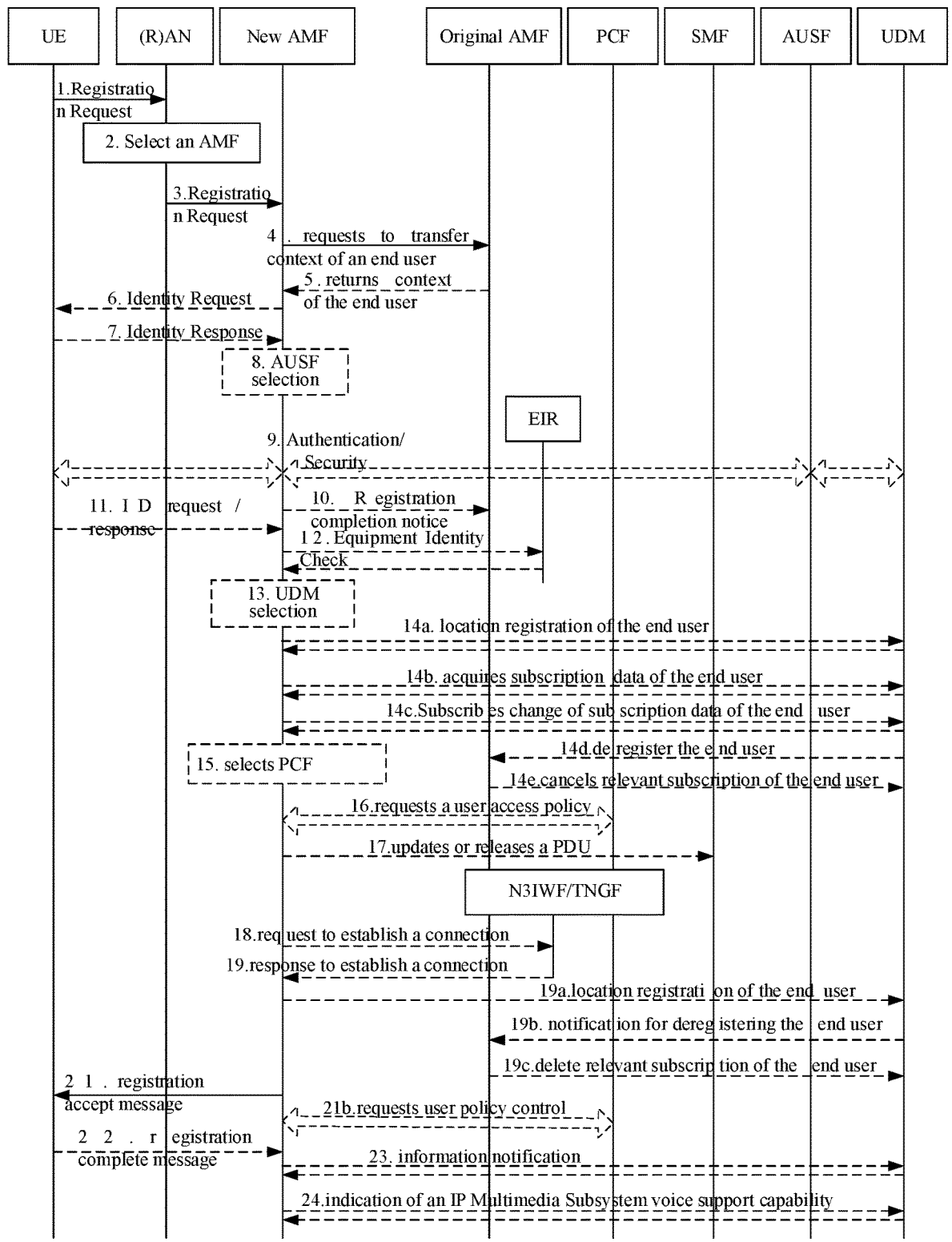
FIG. 4 is a service flow chart of 5G user registration.

Referring to FIG. 4, a service flow chart of 5G user registration is as follows:

1. a User Equipment (UE) sends a Registration Request to a (Radio) Access Network ((R)AN).

2. An access network selects the Access and Mobility Management Function (AMF) (AMF selection).

3. The access network sends the Registration Request (Registration Request) to the new AMF.

4. The new AMF requests an original AMF to transfer context information of the end user (Namf_Communication_UEContextTransfer).

5. The original AMF returns the context information of the end user (Namf_Communication_UEContextTransfer response) to the new AMF.

6. The new AMF sends an Identity Request to the end user.

7. The end user sends an ID response (Identity Response) to the new AMF.

8. The new SMF selects an AUSF (AUSF selection).

9. The end user performs an authentication process (authentication/security, Authentication/Security) with the core network.

10. The new AMF sends a result of the registration of the end user-registration completion notice (Namf_Communication_RegistrationCompleteNotify) to the original AMF.

11. ID acquisition process between the new AMF and the end user-ID request/response (Identity Request/Response).

12. The new AMF requests an Equipment Identity Register (EIR) to perform an Equipment Identity Check (N5g-eir_EquipmentIdentityCheck_Get).

13. The new AMF selects the Unified Data Management (UDM) (UDM selection).

14a. The new AMF performs location registration of the end user with the UDM (Nudm_UECM_Registration).

14b. The new AMF acquires subscription data of the end user from the UDM (Nudm_SDM_Get).

14c. The new AMF subscribes, to the UDM, change of subscription data of the end user (Nudm_SDM_Subscribe).

14d. The UDM notifies the original AMF to deregister the end user (Nudm_UECM_DeregistrationNotify).

14e. The original AMF cancels relevant subscription of the end user to the UDM (Nudm_SDM_Unsubscribe).

15. The new AMF selects a Policy Control Function (PCF).

16. The new AMF requests a user access policy to the UDM (AM Policy Association Establishment/Modification).

17. The new AMF updates or releases a Protocol Data Unit (PDU) session to the Session Management Function (SMF) (Nsmf_PDUSession_UpdateSMContext/Nsmf_PDUSession_ReleaseSMContext).

18. When a non-Third Generation Partnership Project (3GPP) access mode exists for the end user, the new AMF needs to establish a connection (N2 AMF Mobility Request) with a non-3GPP InterWorking Function/Trusted Non-3GPP Gateway Function (N3IWF/TNGF) connected to the end user.

19. N3Iwf/TNGF returns a response to the new AMF (N2 AMF MobilityResponse).

19a. The new AMF performs location registration of the end user with the UDM (Access type is "non-3GPP access") (Nudm_UECM_Registration).

19b. The UDM notifies the original AMF to deregister the end user (Nudm_UECM_DeregistrationNotify).

19c. The UDM notifies the original AMF to delete relevant subscription of the end user (Nudm_SDM_Unsubscribe).

21. The new AMF sends a registration accept message (Registration Accept) to the end user.

21b. The new AMF requests user policy control (UE Policy Association Establishment) from the PCF.

22. The UE responds, to the new AMF, with a Registration Complete message (Registration Complete).

23. If the UDM requests the end user to return an acknowledgement after the end user receives a change indication of slice subscription information or the like, the AMF will send a notification (Nudm_SDM_Info) to the UDM, to provide the acknowledgement of the UE.

24. The AMF sends an indication of an IP Multimedia Subsystem (IMS) voice support capability to the UDM through Nudm_UECM_Update.

Figure 5:
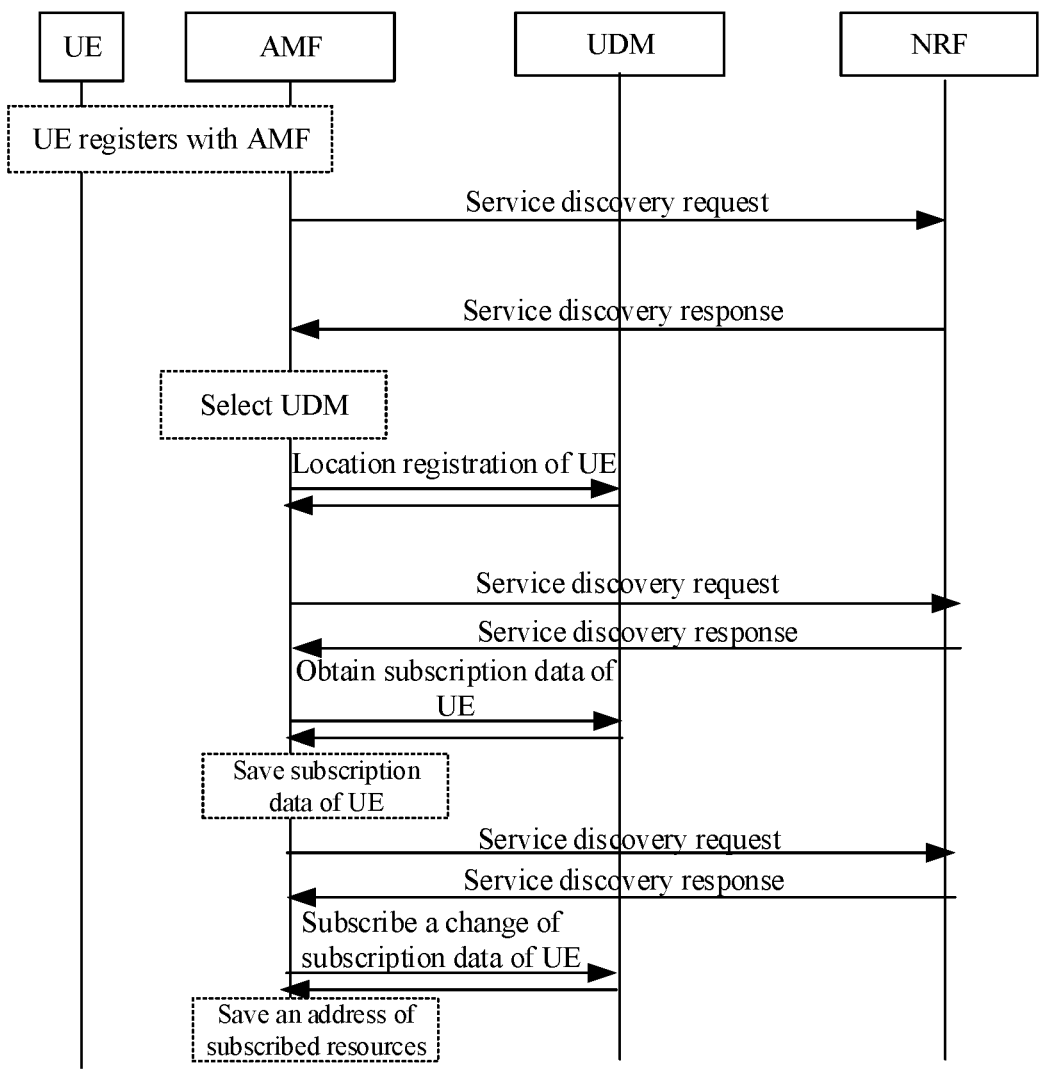
FIG. 5 is a specific flow chart of three service invocations including location registration, downloading subscription data, and subscribing a change of subscription data.

In FIG. 4, 14a/14b/14c correspond to location registration, downloading subscription data and subscribing a change of subscription data, respectively. These three service invocations are three independent services/service operations, and the AMF needs to invoke three UDM services before completion. In addition, the NF for the service consumer needs to perform the service discovery with the NRF before the service invocation, to obtain an address of the NF for the service provider. Therefore, the above three service invocations also include a service discovery process. In case the result of the service discovery is not cached, three service discovery processes are required. Please refer to FIG. 5 for specific flows of the three service invocations of the location registration, the downloading subscription data and the subscribing a change of subscription data, wherein, the service discovery request sent by the AMF for the first time carries a UE identifier (UE ID), a target network function type (NF type) which is UDM, a service name which is Nudm_UECM_Registration, the service discovery response sent by the UDM for the first time includes a UDM list, and the service discovery requests sent by the AMF for the second and third times carry a UDM Instance Identifier (ID), the service discovery responses sent by the UDM for the second and third times include the service address of the UDM.

In a 4G (fourth generation mobile communication technology) network, location registration, downloading subscription data and subscribing a change of subscription data require only one interaction. User subscription data is carried in an update location ACK for the location registration. After the location registration succeeds, a Home Subscriber Server (HSS) supports by default an initiation of a subscription data modification process to a Mobility Management Entity (MME).

Comparing user attach service processes of 4G and 5G, it can be seen that the service atomization design of the 5G core network increases the number of service process steps.

Figure 6:
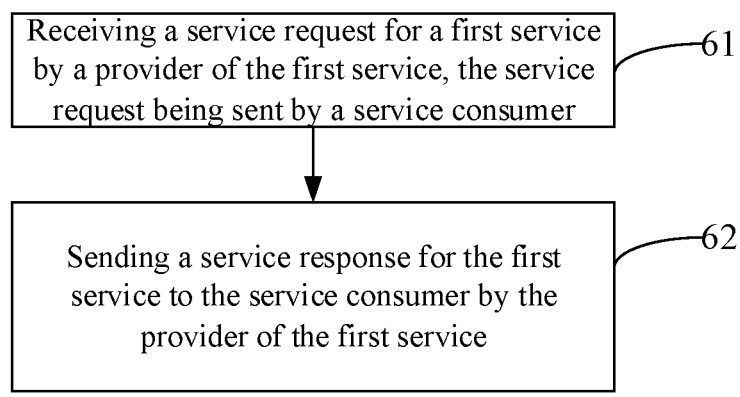
FIG. 6 is a flow chart of a service invocation method according to a first embodiment of the present disclosure.

Please refer to FIG. 6. FIG. 6 is a schematic flow chart of a service invocation method according to a first embodiment of the present disclosure. The method includes following steps.

Step 61: receiving, by a provider of a first service, a service request for a first service sent by a service consumer;

Step 62: sending, by the provider of the first service, a service response for the first service to the service consumer.

The service response for the first service includes service invocation information or a service invocation result of at least one second service associated with the first service; the service invocation information is used to instruct the service consumer to invoke the second service.

It should be noted that the provider of the first service and the provider of the second service may be the same NF.

In the embodiment of the present disclosure, after the provider of the first service receives the service request for the first service sent by the service consumer, and if the provider of the first service can determine the second service that the service consumer need to invoke later, then the service response for the first service carries the service invocation information or the service invocation result of the second service (this is mainly applicable to a case in which the provider of the first service and the provider of the second service are the same NF, and the service provider can obtain the service invocation result of the second service based on currently obtained information), thereby optimizing the service processing logic and reducing service processing complexity.

In particular, on one hand, since the service invocation information may be used to indicate invocation of the second service, a service invocation logic of the service consumer may be omitted. On the other hand, since the service invocation information may be used to indicate the provider of the second service, the service discovery process of the service consumer may be omitted.

Provided below is an example of the service invocation method describe above.

A selected NF of a specific service provider in one service process may provide, to the service consumer, service invocation information of a next service invocation step or next few service invocation steps according to the service processing logic, so that the service discovery process and the service invocation logic of the service consumer may be omitted.

Thus, in an optional embodiment of the present disclosure, the service response for the first service includes service invocation information of at least one second service associated with the first service, and the service invocation information is used to instruct the service consumer to invoke the second service.

Optionally, the service invocation information includes at least one of the following:
a service name of the second service;
an address of a service provider for the second service;
a parameter required for the service invocation of the second service, which include a necessary header and a message body of a service request message;
an address of a resource associated with the second service;
a method of operating resources associated with the second service;
a premise of the second service, wherein the second service is invoked only if the premise is satisfied.

The method of operating resources includes adding (that is, addition), deleting (that is, deletion), changing (that is, change) and searching (that is, search).

Optionally, in a case where the service request for the first service is a request of the service of location registration, the second service includes a service of downloading subscription data and a service of subscribing a change of subscription data; the service invocation information of the second service includes service invocation information of the service of downloading subscription data and service invocation information of the service of subscribing the change of subscription data.

Figure 7:
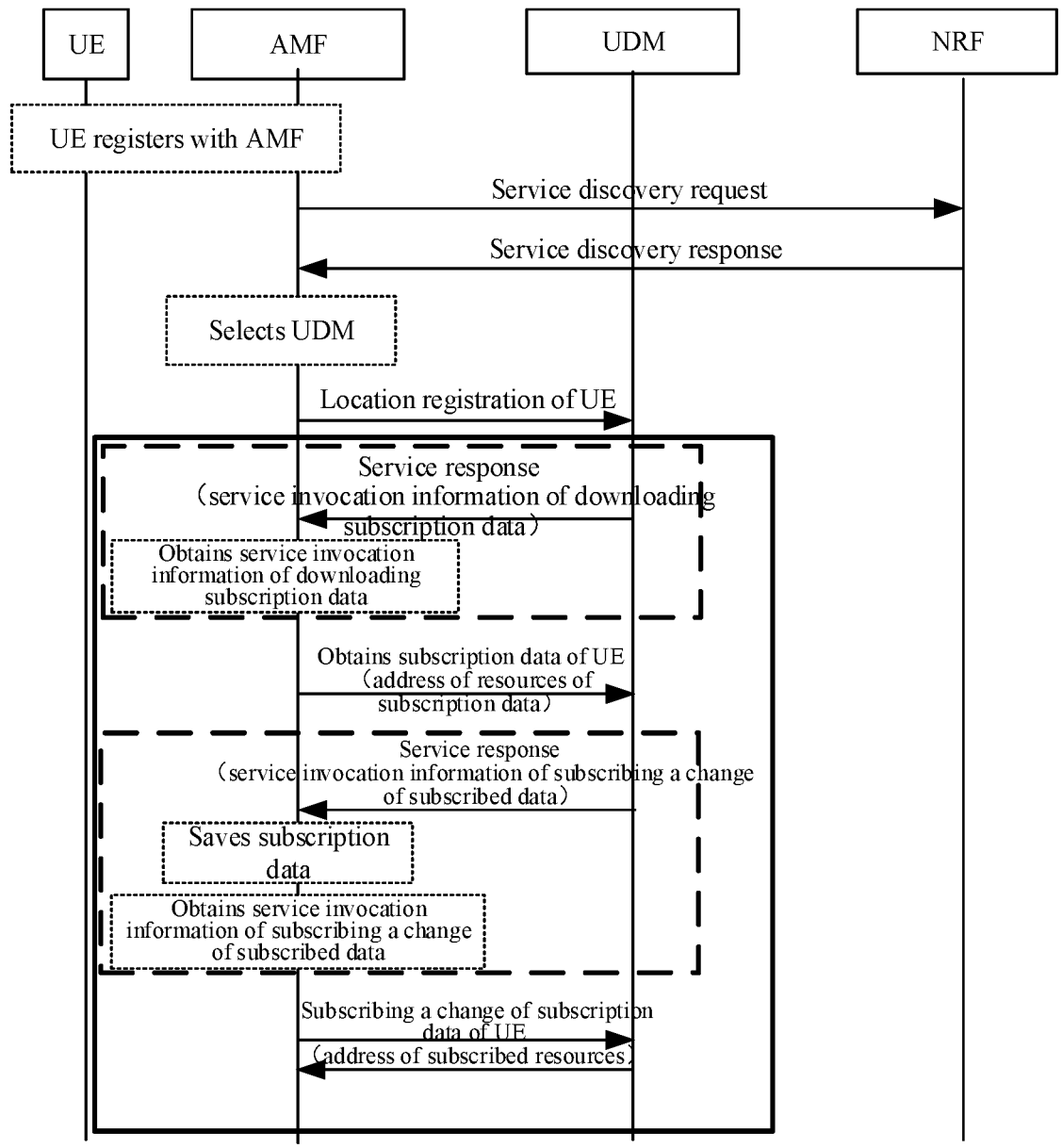
FIG. 7 is a specific flow chart of three service invocations of location registration, downloading subscription data and subscribing a change of subscription data according to an embodiment of the present disclosure.

In addition, referring to FIG. 7, when the service request for the first service is a request of a location registration service, the second service may only include the service of downloading the subscription data; the service invocation information of the second service includes service invocation information of the service of downloading the subscription data.

Then, when the UDM receives the request, sent by the AMF, for the service of downloading subscription data, the request for the service of downloading subscription data is the service request for the first service, and the second service includes the service of subscribing a change of subscription data. The service invocation information of the second service includes service invocation information of the service of subscribing a change of subscription data.

That is, in case that the service request for the first service is a request for the service of downloading subscription data, the second service includes the service of subscribing the change of subscription data; the service invocation information of the second service includes service invocation information of the service of subscribing the change of subscription data.

In the related art, the NF for the service provider may return different response codes or instructions to the service consumer according to the service processing logic, and the NF for the service consumer performs different subsequent processing according to the response codes or instructions. Specifically, after the service consumer receives the response codes returned by the service provider, the service consumer needs to determine a service processing branch according to the response codes.

In the embodiment of the present disclosure, when a provider of the first service responds to the service request for the first service, the provider of the first service, in addition to obtaining the response codes for the service request for the first service, may also obtain the service invocation information of the second service corresponding to the response codes, and then the response codes and the service invocation information of the second service may be carried in the service response for the first service. Therefore, after the service consumer receives the service response, the service consumer may directly initiate invocation of the second service according to the service invocation information of the second service. In this way, an operation of adapting a service processing branch to the response codes by the service consumer is omitted, and the service invocation logic and/or the service discovery process of the service consumer is simplified.

Figure 8:
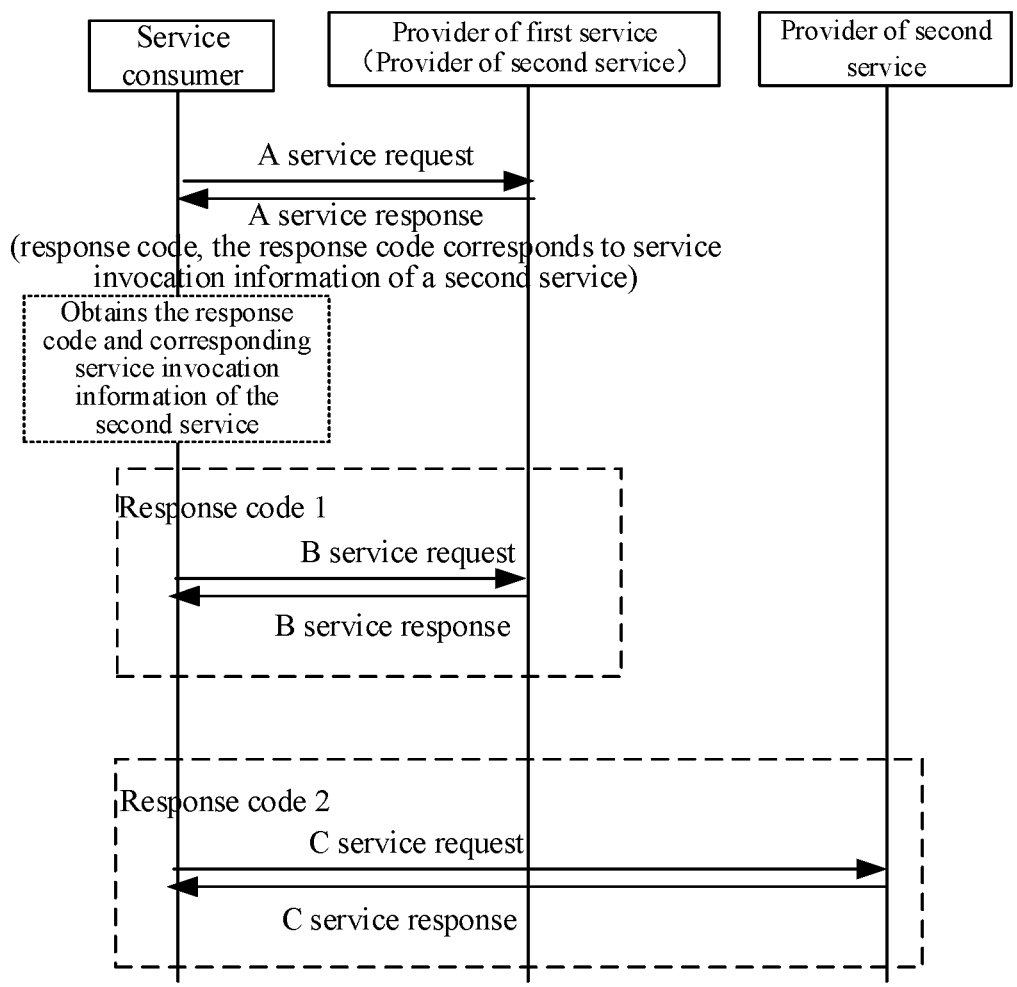
FIG. 8 is a flow chart of performing different service invocations according to service invocation information in an embodiment of the present disclosure.

For example, referring to FIG. 8, the service consumer sends a request of an A service to the provider of the first service, and the provider of the first service performs corresponding service processing after receiving the request of the A service and obtains a corresponding response code and service invocation information of a corresponding second service. Specifically, if the response code is 1, then the corresponding second service is a B service; if the response code is 2, then the corresponding second service is a C service, and finally the response of the A service carries the response code and the service invocation information of the second service corresponding to the response code. After the service consumer receives the response of the A service, the service consumer obtains the response code and the service invocation information of the corresponding second service, and initiates the second service according to the service invocation information of the second service. Specifically, if the service invocation information of the B service is carried in the response of the A service, invocation of the B service is initiated (the service provider of the B service is the same as the service provider of the A service); if the service invocation information of the C service is carried in the response of the A service, the invocation of the C service is initiated (the service provider of the C service is different from the service provider of the A service).

In another optional embodiment of the present disclosure, the service response for the first service includes a service invocation result of at least one second service associated with the first service.

Optionally, the service invocation result includes at least one of: data; an address of a resource; a response code.

The service invocation result of obtaining the data resource may specifically include the data and/or the address of the data resource. If the address of the data resource only is included in the service response, then the service consumer can obtain the corresponding data according to the address. Optionally, the data may or may not be on the service provider.

For the three service invocations of location registration, downloading subscription data and subscribing a change of subscription data initiated by the AMF in the 5G user attach process, since an order of the invocations is fixed, and the service consumer/service provider is unchanged, process optimization can be performed.

Optionally, when the service request for the first service is the request of the service of location registration, the second service includes a service of downloading subscription data and a service of subscribing a change of subscription data; the service invocation result of the second service includes an address of the subscription data resource and an address of a subscribed resource.

In the embodiment of the present disclosure, after receiving the request of the service of location registration, the UDM, as a service provider, may perform optimization for a plurality of service processing logics associated with each other.

Specifically, the operations performed by the UDM after receiving the request of the service of location registration are as follows:

1. the UDM receives the request of the service of location registration, and obtains a UE identifier (UE ID) and an AMF address;

2. the UDM queries subscription data of the UE according to the UE ID to obtain the address of the subscription data resource of the UE;

3, the UDM subscribes the change of subscription data for the UE, and obtains the address of the subscribed resource;

4. the UDM provides the addresses of the subscription data resource and the subscribed resource in the response of location registration.

Figure 9:
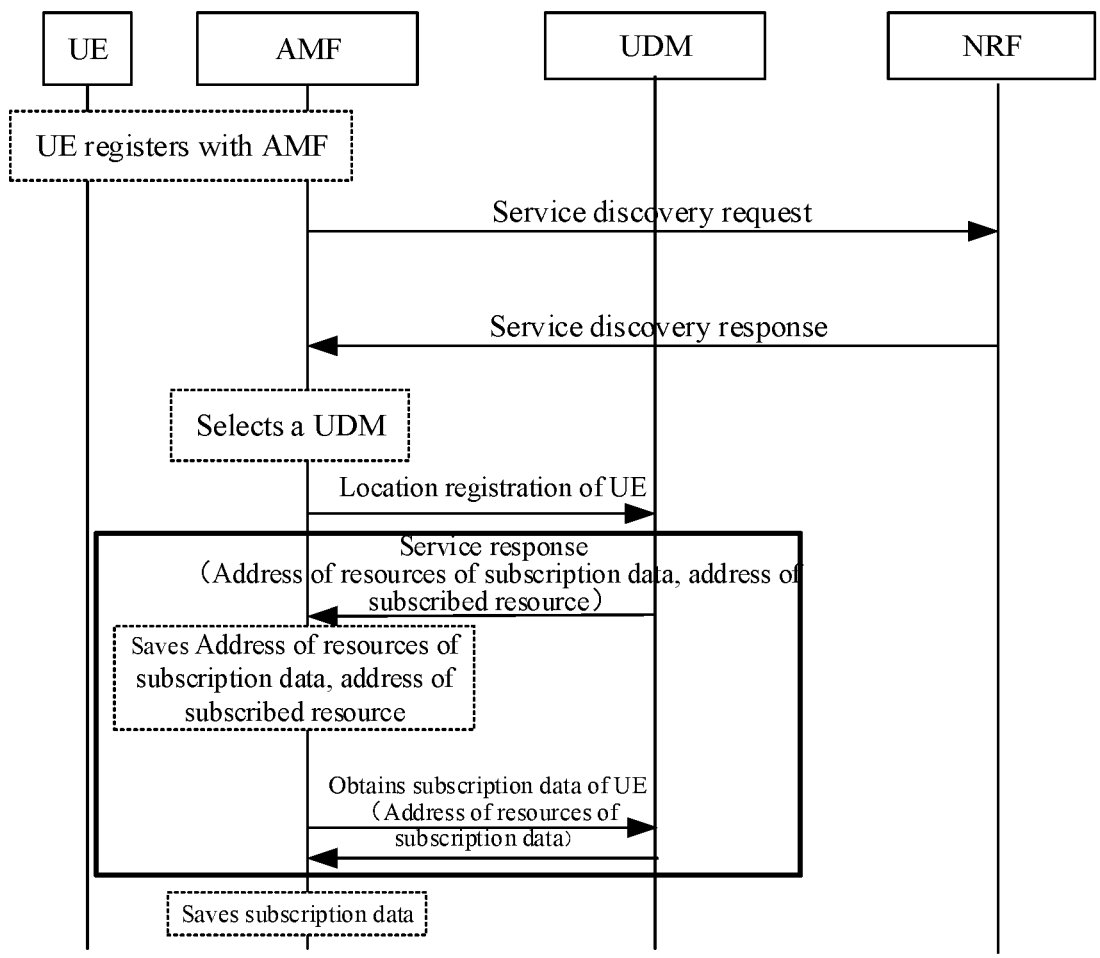
FIG. 9 is another specific flow chart of three service invocations of location registration, downloading subscription data and subscribing a change of subscription data in an embodiment of the present disclosure.

Therefore, referring to FIG. 9, the AMF can obtain the addresses of the subscription data resource and the subscribed resource in the response of the location registration without invoking to the UDM the services of downloading subscription data and subscribing the subscription data, and without initiating the service discovery process.

Of course, in other optional embodiments, in a case where the service request for the first service is the request of the service of location registration, the second service may only include the service of downloading subscription data, the service invocation result of the second service correspondingly only includes the address of the subscription data resource. If the service request for the first service is the request of the service of downloading subscription data, the second service includes the service of subscribing the change of subscription data, and a service invocation result of the second service includes an address of a subscribed resource.

Figure 10:
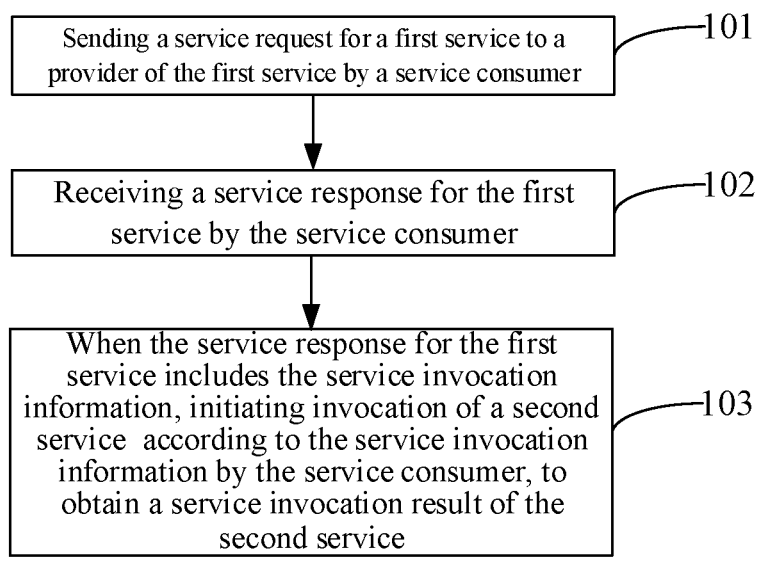
FIG. 10 is a flow chart of a service invocation method according to a second embodiment of the present disclosure.

Please refer to FIG. 10. FIG. 10 is a schematic flow chart of a service invocation method according to a second embodiment of the present disclosure. The method includes the following steps 101-103.

Step 101: sending a service request for a first service to a provider of the first service by a service consumer.

Step 102: receiving a service response for the first service by the service consumer, wherein the service response for the first service includes service invocation information or a service invocation result of at least one second service associated with the first service; the service invocation information is used to instruct the service consumer to invoke the second service.

Step 103: when the service response for the first service includes the service invocation information, initiating invocation of a second service according to the service invocation information by the service consumer to obtain a service invocation result of the second service.

In the embodiment of the present disclosure, after receiving the service request for the first service sent by the provider of the first service, if the provider of the first service can determine the second service that the service consumer needs to invoke subsequently, then the service response for the first service carries the service invocation information or the service invocation result of the second service, thereby optimizing the service processing logic and reducing the service processing complexity.

Optionally, the service invocation information includes at least one of:
- a service name of the second service;
- an address of a service provider for the second service;
- a parameter required for service invocation of the second service;
- an address of a resource associated with the second service;
- a method of operating resources associated with the second service;
- a premise for the second service.

Optionally, the service invocation result includes at least one of: data; an address of a resource; a response code.

Optionally, in a case where the service request for the first service is a request of the service of location registration, the second service includes a service of downloading subscription data and a service of subscribing a change of subscription data; the service invocation result of the second service includes an address of the subscription data resource and an address of a subscribed resource.

Optionally, in a case where the service request for the first service is a request of the service of location registration, the second service includes a service of downloading subscription data and a service of subscribing a change of subscription data; the service invocation information of the second service includes service invocation information for downloading the subscription data and service invocation information for subscribing the change of the subscription data.

Optionally, in a case where the service request for the first service is a request of the service of location registration, the second service includes the service of downloading subscription data; the service invocation information of the second service includes service invocation information for the service of downloading the subscription data.

Optionally, in a case where the service request for the first service is the request for the service of downloading subscription data, the second service includes the service of subscribing the change of subscription data; the service invocation information of the second service includes service invocation information of the service of subscribing the change of subscription data.

This embodiment of the present disclosure corresponds to the first embodiment aforementioned above, has the same inventive concept as above, and achieves the same technical effect. For details of this embodiment, please refer to the first embodiment which is not repeated here.

Figure 11:
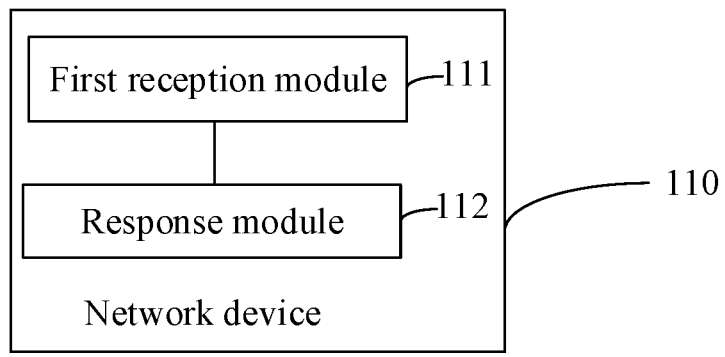
FIG. 11 is a schematic structural diagram of a network device in a third embodiment of the present disclosure.

Please refer to FIG. 11. FIG. 11 is a schematic structural diagram of a network device according to a third embodiment of the present disclosure, wherein the network device 110 is a provider of a first service, and includes: a first reception module 111, configured to receive a service request for a first service, the service request being sent by a service consumer; a response module 112, configured to send a service response for the first service to the service consumer; wherein, the service response for the first service includes service invocation information or a service invocation result of at least one second service associated with the first service; the service invocation information is used to instruct the service consumer to invoke the second service.

In the embodiment of the present disclosure, after the provider of the first service receives the service request for the first service sent by the service consumer, and if the provider of the first service can determine the second service that the service consumer needs to invoke subsequently, then the service response for the first service carries the service invocation information or the service invocation result of the second service, thereby optimizing the service processing logic and reducing the service processing complexity.

Optionally, the service invocation information includes at least one of following: a service name of the second service; an address of a service provider of the second service; a parameter required for service invocation for the second service, which includes a necessary header and a message body of a service request message; an address of a resource associated with the second service; a method of operating resources associated with the second service; a premise of the second service.

Optionally, the service invocation result includes at least one of: data; an address of a resource; a response code.

Optionally, when the service request for the first service is a request for the service of location registration, the second service includes a service of downloading subscription data and a service of subscribing a change of subscription data; the service invocation result of the second service includes an address of the subscription data resource and an address of the subscribed resource.

Optionally, when the service request for the first service is a request for the service of location registration, the second service includes a service of downloading subscription data and a service of subscribing a change of subscription data; the service invocation information of the second service includes service invocation information of the service of downloading the subscription data and service invocation information of the service of subscribing the change of the subscription data.

Optionally, if the service request for the first service is a request for the service of location registration, then the second service includes the service of downloading subscription data; the service invocation information of the second service includes service invocation information of the service of downloading the subscription data.

Optionally, when the service request for the first service is a request for the service of downloading the subscription data, the second service includes a service of subscribing a change of subscription data; the service invocation information of the second service includes service invocation information of a service of subscribing a change of subscription data.

The embodiment of the present disclosure is a product embodiment corresponding to the first embodiment of the method, and thus is not repeated here, and please refer to the first embodiment for details.

Figure 12:
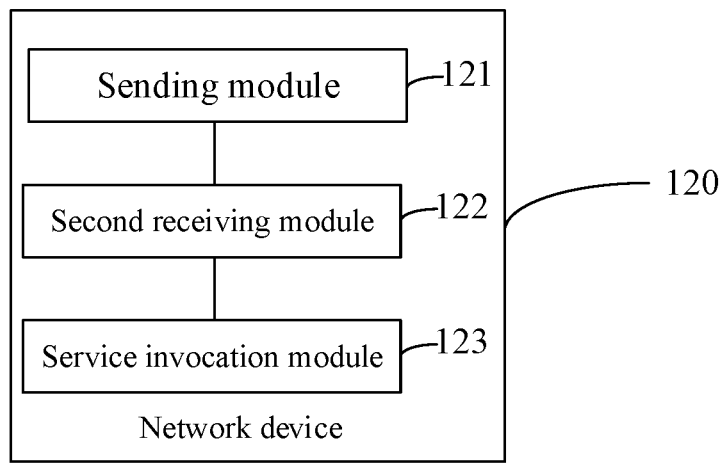
FIG. 12 is a schematic structural diagram of a network device according to a fourth embodiment of the present disclosure.

Please refer to FIG. 12. FIG. 12 is a schematic structural diagram of a network device according to a fourth embodiment of the present disclosure, wherein the network device 120 is a service consumer, and includes: a sending module 121, configured to send a service request for a first service to a provider of a first service; a second receiving module 122, configured to receive a service response for the first service, wherein the service response for the first service includes service invocation information or a service invocation result of at least one second service associated with the first service; the service invocation information is used to instruct the service consumer to invoke the second service; a service invocation module 123, configured to initiate a second service invocation according to the service invocation information when the service response for the first service includes the service invocation information, to obtain the service invocation result of the second service.

In the embodiment of the present disclosure, after the provider of the first service receives the service request for the first service sent by the service consumer, and if the provider of the first service can determine the second service that the service consumer needs to invoke subsequently, then the service response for the first service carries the service invocation information or the service invocation result of the second service, thereby optimizing the service processing logic and reducing the service processing complexity.

Optionally, the service invocation information includes at least one of the following: a service name of the second service; an address of a service provider of the second service; a parameter required for service invocation of the second service, which includes a necessary header and a message body of a service request message; an address of a resource associated with the second service; a method of operating resources associated with the second service; a premise of the second service.

Optionally, in a case where the service request for the first service is a request for the service of location registration, the second service includes a service of downloading subscription data and a service of subscribing a change of subscription data; the service invocation result of the second service includes an address of a subscription data resource and an address of a subscribed resource.

Optionally, in a case where the service request for the first service is a request for the service of location registration, the second service includes a service of downloading subscription data and a service of subscribing a change of subscription data; the service invocation information of the second service includes service invocation information of a service of downloading the subscription data and service invocation information of a service of subscribing the change of subscribed data.

The embodiment of the present disclosure is a product embodiment corresponding to the second embodiment of the method, and thus it is not repeated here, and please refer to the second embodiment of the method for details.

Figure 13:
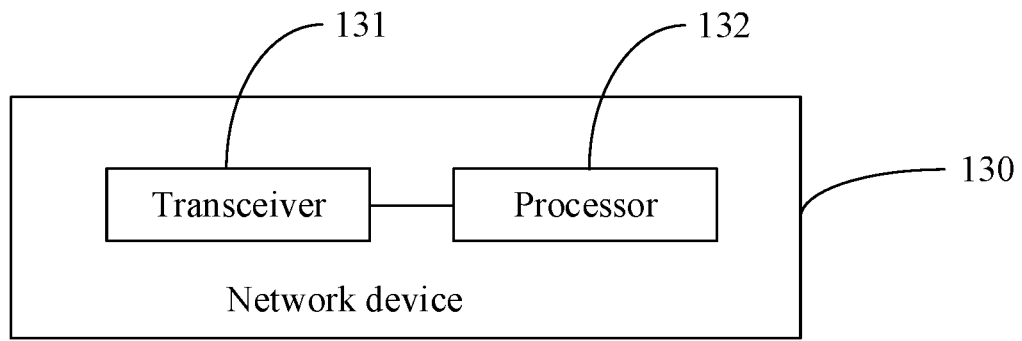
FIG. 13 is a schematic structural diagram of a network device according to a fifth embodiment of the present disclosure.

Please refer to FIG. 13. FIG. 13 is a schematic structural diagram of a network device according to a fifth embodiment of the present disclosure, wherein the network device 130 is a provider of a first service, and includes a transceiver 131 and a processor 132.

The transceiver 131 is configured to receive a service request for a first service, the service request being sent by a service consumer; the transceiver 131 is further configured to send a service response for the first service to the service consumer.

The service response for the first service includes service invocation information or a service invocation result of at least one second service associated with the first service; the service invocation information is used to instruct the service consumer to invoke the second service.

In the embodiment of the present disclosure, after the provider of the first service receives the service request for the first service sent by the service consumer, and if the provider of the first service can determine the second service that the service consumer needs to invoke subsequently, then the service response for the first service carries the service invocation information or the service invocation result of the second service, thereby optimizing the service processing logic and reducing the service processing complexity.

Optionally, the service invocation information includes at least one of the following: a service name of the second service; an address of a service provider of the second service; a parameter required for the service invocation of the second service, which includes a necessary header and a message body of a service request message; an address of a resource associated with the second service; a method of operating a resource associated with the second service; a premise of the second service.

Optionally, the service invocation result includes at least one of: data; an address of a resource; a response code.

Optionally, when the service request for the first service is a request for the service of location registration, the second service includes a service of downloading subscription data and a service of subscribing a change of subscription data; the service invocation result of the second service includes an address of the subscription data resource and an address of a subscribed resource.

Optionally, in a case where the service request for the first service is a request for the service of location registration, the second service includes a service of downloading subscription data and a service of subscribing a change of subscription data; the service invocation information of the second service includes service invocation information of a service of downloading the subscription data and service invocation information of a service of subscribing the change of subscription data.

Optionally, if the service request for the first service is a request for the service of location registration, the second service includes the service of downloading the subscription data; the service invocation information of the second service includes service invocation information of the service of downloading the subscription data.

Optionally, when the service request for the first service is a request for a service for downloading subscription data, the second service includes a service of subscribing a change of subscription data; the service invocation information of the second service includes service invocation information of the service of subscribing a change of subscription data.

The embodiment of the present disclosure is a product embodiment corresponding to the first embodiment of the method, and thus the description thereof is omitted herein, and please refer to the first embodiment of the method for details.

Figure 14:
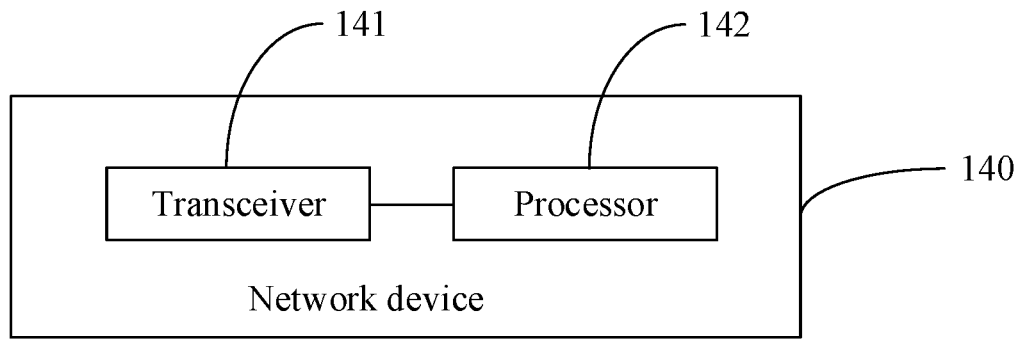
FIG. 14 is a structural schematic diagram of a network device according to a sixth embodiment of the present disclosure.

Please refer to FIG. 14, FIG. 14 is a schematic structural diagram of a network device provided in a sixth embodiment of the present disclosure. The network device 140 is a service consumer, and includes a transceiver 141 and a processor 142.

The transceiver 141 is configured to send a service request for a first service to a provider of the first service; the transceiver 141 is further configured to receive a service response for the first service, the service response for the first service includes service invocation information or a service invocation result of at least one second service associated with the first service; the service invocation information is used to instruct the service consumer to invoke the second service; the transceiver 141 is further configured to initiate an invocation of the second service according to the service invocation information when the service response for the first service includes the service invocation information, to obtain a service invocation result of the second service.

In the embodiment of the present disclosure, after the provider of the first service receives the service request for the first service sent by the service consumer, and if the provider of the first service can determine the second service that the service consumer needs to subsequently invoke, then the service response for the first service carries the service invocation information or the service invocation result of the second service, thereby optimizing the service processing logic and reducing the service processing complexity.

Optionally, the service invocation information includes at least one of the following: a service name of the second service; an address of a service provider of the second service; a parameter required for the service invocation of the second service which including a necessary header and a message body of a service request message; an address of a resource associated with the second service; a method of operating resources associated with the second service; a premise of the second service.

Optionally, in a case where the service request for the first service is a request for the service of location registration, the second service includes a service of downloading subscription data and a service of subscribing a change of subscription data; the service invocation result of the second service includes an address of the subscription data resource and an address of a subscribed resource.

Optionally, when the service request for the first service is a request for the service of location registration, the second service includes a service of downloading subscription data and a service of subscribing a change of subscription data; the service invocation information of the second service includes service invocation information of the service of downloading subscription data and service invocation information of subscribing the change of subscription data.

The embodiment of the present disclosure is a product embodiment corresponding to the second embodiment of the method, thus the detailed description is omitted herein, and please refer to the second embodiment for details.

Figure 15:
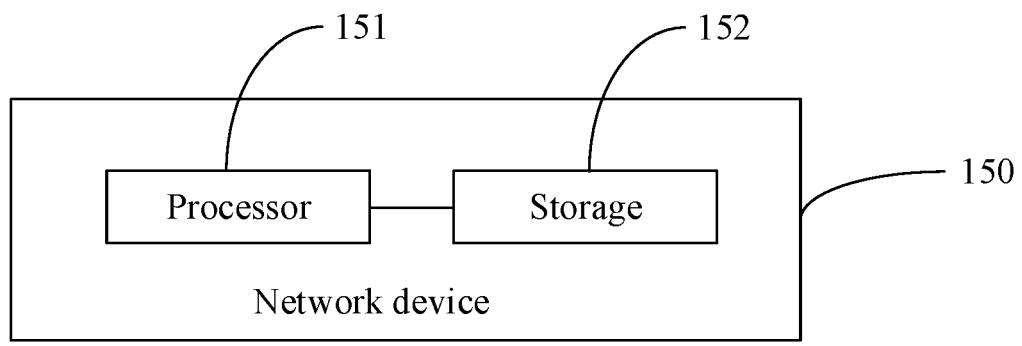
FIG. 15 is a schematic structural diagram of a network device in a seventh embodiment of the present disclosure.

Please refer to FIG. 15, FIG. 15 is a schematic structural diagram of a network device provided in a seventh embodiment of the present disclosure. The network device 150 is a provider of a first service. The network device 150 includes a processor 151, a storage 152 and a computer program stored on the storage 152 and executable on the processor 151. When the processor 151 executes the computer program, the processor 151 implements the following steps: receiving a service request for a first service, the service request being sent by a service consumer; sending a service response for the first service to the service consumer; wherein, the service response for the first service includes service invocation information or a service invocation result of at least one second service associated with the first service; the service invocation information is used to instruct the service consumer to invoke the second service;

In the embodiment of the present disclosure, after the provider of the first service receives the service request for the first service sent by the service consumer, and if the provider of the first service can determine the second service that the service consumer needs to invoke subsequently, then the service response for the first service carries the service invocation information or the service invocation result of the second service, thereby optimizing the service processing logic and reducing the service processing complexity.

Optionally, the service invocation information includes at least one of: a service name of the second service; an address of a service provider of the second service; a parameter required for service invocation for the second service, which includes a necessary header and a message body of a service request message; an address of a resource associated with the second service; a method of operating resources associated with the second service; a premise of the second service.

Optionally, the service invocation result includes at least one of: data; an address of a resource; a response code.

Optionally, when the service request for the first service is a request for the service of location registration, the second service includes a service of downloading subscription data and a service of subscribing a change of subscription data; the service invocation result of the second service includes an address of the subscription data resource and an address of the subscribed resource.

Optionally, when the service request for the first service is a request for the service of location registration, the second service includes a service of downloading subscription data and a service of subscribing a change of subscription data; the service invocation information of the second service includes service invocation information of the service of downloading the subscription data and service invocation information of the service of subscribing the change of the subscription data.

Optionally, if the service request for the first service is a request for the service of location registration, then the second service includes the service of downloading subscription data; the service invocation information of the second service includes service invocation information of the service of downloading the subscription data.

Optionally, when the service request for the first service is a request for the service of downloading the subscription data, the second service includes a service of subscribing a change of subscription data; the service invocation information of the second service includes service invocation information of a service of subscribing a change of subscription data.

A specific working process of the embodiment of the present disclosure is the same as that of the above-mentioned first embodiment of the method, and thus is not described in details, detailed description of this embodiment may be obtained by referring to the above-mentioned first embodiment of the method.

Figure 16:
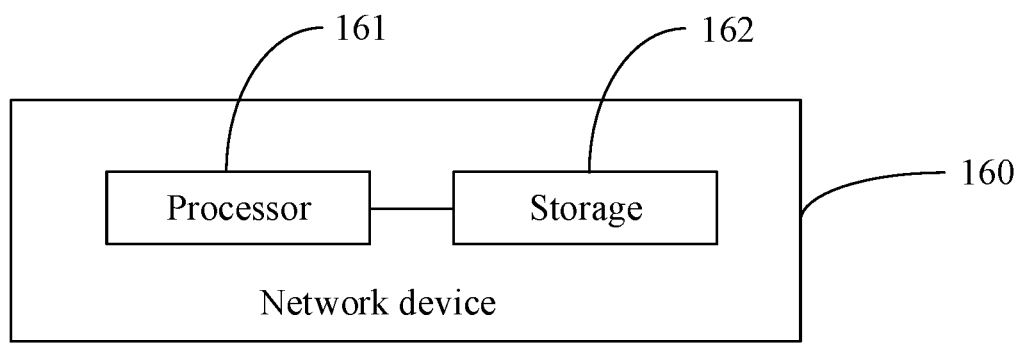
FIG. 16 is a schematic structural diagram of a network device according to an eighth embodiment of the present disclosure.

Please refer to FIG. 16. FIG. 16 is a schematic structural diagram of a network device provided by an eighth embodiment of the present disclosure, wherein the network device 160 is a service consumer, and includes a processor 161, a storage 162, and a computer program stored on the storage 162 and executable on the processor 161. When the processor 161 executes the computer program, the processor 161 implements following steps: sending a service request for a first service to a provider of a first service; receiving a service response for the first service, wherein the service response for the first service includes service invocation information or a service invocation result of at least one second service associated with the first service; the service invocation information is used to instruct the service consumer to invoke the second service; initiating a second service invocation according to the service invocation information when the service response for the first service includes the service invocation information, to obtain the service invocation result of the second service.

In the embodiment of the present disclosure, after the provider of the first service receives the service request for the first service sent by the service consumer, and if the provider of the first service can determine the second service that the service consumer needs to invoke subsequently, then the service response for the first service carries the service invocation information or the service invocation result of the second service, thereby optimizing the service processing logic and reducing the service processing complexity.

Optionally, the service invocation information includes at least one of the following: a service name of the second service; an address of a service provider of the second service; a parameter required for service invocation of the second service, which includes a necessary header and a message body of a service request message; an address of a resource associated with the second service; a method of operating resources associated with the second service; a premise of the second service.

Optionally, in a case where the service request for the first service is a request for the service of location registration, the second service includes a service of downloading subscription data and a service of subscribing a change of subscription data; the service invocation result of the second service includes an address of a subscription data resource and an address of a subscribed resource.

Optionally, in a case where the service request for the first service is a request for the service of location registration, the second service includes a service of downloading subscription data and a service of subscribing a change of subscription data; the service invocation information of the second service includes service invocation information of a service of downloading the subscription data and service invocation information of a service of subscribing the change of subscribed data.

A specific working process of the embodiment of the present disclosure is the same as that in the second embodiment of the method, and thus is not described in details. Detailed description of this embodiment may be obtained by referring to steps in the second embodiment of the method.

A ninth embodiment of the present disclosure provides a computer readable storage medium having a computer program stored thereon. When the computer program, is executed by a processor, the processor implements the steps in any one of the service invocation methods described in the first embodiment or the second embodiment. Please refer to the description of the steps of the methods in the above corresponding embodiments for details.

The computer readable storage media described above include permanent and non-permanent, removable and non-removable media. Storage of information may be implemented by any method or technology. The information may be computer readable instructions, data structures, modules of a program, or other data. Examples of computer storage media include, but are not limited to, a Phase-change RAM (PRAM), a static random access memory (SRAM), a dynamic random access memory (DRAM), other types of random access memory (RAM), a read only memory (ROM), Electrically Erasable Programmable Read Only Memory (EEPROM), a flash memory or other memory technology, a Compact Disk Read Only Memory (CD-ROM), a digital versatile disk (DVD) or other optical storage, a magnetic tape cartridge, a magnetic-tape type magnetic disk storage or other magnetic storage device or any other non-transmission medium may be used to store information that may be accessed by a computing device.

It will be appreciated that the embodiments described in the embodiments of the present disclosure may be implemented in hardware, software, firmware, middleware, microcode, or combinations thereof. For implementation by hardware, units, modules, sub-units and sub-modules may be implemented in one or more of Application Specific Integrated Circuits (ASICs), Digital Signal Processing (DSP), a Digital Signal Processing Device (DSP Device, DSPD), a Programmable Logic Device (PLD), a Field-Programmable Gate Array (FPGA), a general purpose processor, controllers, microcontrollers, microprocessors, other electronic units for performing the functions described in the present disclosure, or combinations thereof.

For implementation by software, techniques described in embodiments of the present disclosure may be implemented by modules (e.g., processes, functions, etc.) that perform the functions described in embodiments of the present disclosure. The software codes may be stored in a memory and executed by a processor. The memory may be implemented in the processor or external to the processor.

The foregoing describes optional embodiments of the present disclosure, and it should be noted that several modifications and embellishments may be made by those of ordinary skill in the art without departing from the principles of the present disclosure, these modifications and embellishments are also to be considered within the protection scope of the present disclosure.

What is claimed is:

1. A service invocation method, comprising:
receiving a service request for a first service by a provider of the first service, the service request being sent by a service consumer; and
sending a service response for the first service to the service consumer by the provider of the first service, wherein, the service response for the first service comprises service invocation information or a service invocation result of at least one second service associated with the first service, the service invocation information is configured to instruct the service consumer to invoke the second service,
wherein, in a case where the service request for the first service is a request for a service of location registration, the second service comprises a service of downloading subscription data and a service of subscribing a change of subscription data; and
the service invocation information of the second service comprises service invocation information of the service of downloading the subscription data and service invocation information of the service of subscribing the change of subscription data.

2. The method according to claim 1, wherein the service invocation information comprises at least one of:
a service name of the second service;
an address of a service provider of the second service;
a parameter required for service invocation of the second service;
an address of a resource associated with the second service;
a method of operating a resource associated with the second service;
a premise of the second service.

3. The method according to claim 1, wherein the service invocation result comprises at least one of: data, an address of a resource, and a response code.

4. The method according to claim 1, wherein, in a case where the service request for the first service is a request for the service of location registration, the second service comprises a service of downloading subscription data and a service of subscribing a change of subscription data; and
the service invocation result of the second service comprises an address of a subscription data resource and an address of a subscribed resource.

5. The method according to claim 1, wherein, in a case where the service request for the first service is a request for a service of location registration, the second service comprises a service of downloading subscription data; and
the service invocation information of the second service comprises service invocation information of the service of downloading the subscription data.

6. The method according to claim 1, wherein, in a case where the service request for the first service is a request for a service of downloading subscription data, the second service comprises a service of subscribing a change of subscription data; and the service invocation information of the second service comprises service invocation information of the service of subscribing the change of the subscription data.

7. A non-transitory computer-readable storage medium having stored thereon a computer program, wherein when the computer program is executed by a processor, the processor implements steps in the service invocation method according to claim 1.

8. A network device, the network device being a provider of a first service, the network device comprising:

a memory, a processor, and a computer program stored on the memory and executable on the processor, wherein, the processor implements steps in the service invocation method according to claim 1 when the processor executes the computer program.

9. The network device according to claim 8, wherein the service invocation information comprises at least one of:

a service name of the second service;
an address of a service provider of the second service;
a parameter required for service invocation of the second service;
an address of a resource associated with the second service;
a method of operating a resource associated with the second service;
a premise of the second service.

10. The network device according to claim 8, wherein the service invocation result comprises at least one of: data, an address of a resource, and a response code.

11. The network device according to claim 8, wherein, in a case where the service request for the first service is a request for a service of location registration, the second service comprises a service of downloading subscription data and a service of subscribing a change of subscription data; and the service invocation information of the second service comprises service invocation information of the service of downloading the subscription data and service invocation information of the service of subscribing the change of subscription data;

or, in a case where the service request for the first service is a request for the service of location registration, the second service comprises a service of downloading subscription data and a service of subscribing a change of subscription data; and the service invocation result of the second service comprises an address of a subscription data resource and an address of a subscribed resource;

or, in a case where the service request for the first service is a request for a service of location registration, the second service comprises a service of downloading subscription data; and the service invocation information of the second service comprises service invocation information of the service of downloading the subscription data;

or, in a case where the service request for the first service is a request for a service of downloading subscription data, the second service comprises a service of subscribing a change of subscription data; and the service invocation information of the second service comprises service invocation information of the service of subscribing the change of the subscription data.

12. A service invocation method, comprising:

sending a service request for a first service to a provider of the first service by a service consumer;

receiving a service response for the first service by the service consumer, wherein the service response for the first service comprises service invocation information or a service invocation result of at least one second service associated with the first service, the service invocation information is configured to instruct the service consumer to invoke the second service; and initiating invocation of a second service according to the service invocation information to obtain the service invocation result of the second service, when the service response for the first service comprises the service invocation information, wherein in a case where the service request for the first service is a request for a service of location registration, the second service comprises a service of downloading subscription data and a service of subscribing a change of subscription data; and the service invocation information of the second service comprises service invocation information of the service of downloading the subscription data and service invocation information of the service of subscribing the change of subscription data.

13. The method according to claim 12, wherein the service invocation information comprises at least one of following:

a service name of the second service;
an address of a service provider of the second service;
a parameter required for service invocation of the second service;
an address of a resource associated with the second service;
a method of operating a resource associated with the second service;
a premise of the second service.

14. The method according to claim 12, wherein in a case where the service request for the first service is a request for a service of location registration, the second service comprises a service of downloading subscription data and a service of subscribing a change of subscription data; and the service invocation result of the second service comprises an address of a subscription data resource and an address of a subscribed resource.

15. A network device, the network device being a service consumer, the network device comprising:

a memory, a processor, and a computer program stored on the memory and executable on the processor; wherein, the processor implements steps in the service invocation method according to claim 12 when the processor executes the computer program.

16. A non-transitory computer-readable storage medium having stored thereon a computer program, wherein when the computer program is executed by a processor, the processor implements steps in the service invocation method according to claim 12.

17. The network device according to claim 15, wherein the service invocation information comprises at least one of following:

a service name of the second service;
an address of a service provider of the second service;
a parameter required for service invocation of the second service;

an address of a resource associated with the second service;

a method of operating a resource associated with the second service;

a premise of the second service.

18. The network device according to claim 15, wherein in a case where the service request for the first service is a request for a service of location registration, the second service comprises a service of downloading subscription data and a service of subscribing a change of subscription data; and the service invocation result of the second service comprises an address of a subscription data resource and an address of a subscribed resource;

or, in a case where the service request for the first service is a request for a service of location registration, the second service comprises a service of downloading subscription data and a service of subscribing a change of subscription data; and the service invocation information of the second service comprises service invocation information of the service of downloading the subscription data and service invocation information of the service of subscribing the change of subscription data.

* * * * *